US012527668B2

United States Patent
Orbay et al.

(10) Patent No.: US 12,527,668 B2
(45) Date of Patent: Jan. 20, 2026

(54) REVERSE SHOULDER PROSTHESIS AND RELATED METHODS

(71) Applicant: Skeletal Dynamics, Inc., Miami, FL (US)

(72) Inventors: Jorge L. Orbay, Miami, FL (US); Robert Sixto, Miami, FL (US); Francisco Rubio, Miami, FL (US)

(73) Assignee: Skeletal Dynamics, Inc., Miami, FL (US)

( * ) Notice: Subject to any disclaimer, the term of this patent is extended or adjusted under 35 U.S.C. 154(b) by 0 days.

(21) Appl. No.: 17/649,142

(22) Filed: Jan. 27, 2022

(65) Prior Publication Data

US 2022/0249241 A1 Aug. 11, 2022

Related U.S. Application Data

(60) Provisional application No. 63/142,344, filed on Jan. 27, 2021.

(51) Int. Cl.
*A61F 2/40* (2006.01)
*A61F 2/30* (2006.01)

(52) U.S. Cl.
CPC .......... *A61F 2/4081* (2013.01); *A61F 2/4059* (2013.01); *A61F 2002/30332* (2013.01);
(Continued)

(58) Field of Classification Search
CPC ...... A61F 2002/4022; A61F 2002/4085; A61F 2002/4037; A61F 2002/4051
See application file for complete search history.

(56) References Cited

U.S. PATENT DOCUMENTS 3,916,451 A * 11/1975 Buechel ................ A61F 2/3854
403/56
4,206,517 A * 6/1980 Pappas ...................... A61F 2/40
623/20.13
(Continued)

FOREIGN PATENT DOCUMENTS

EP 1591084 4/2019
JP 2017532162 11/2017
(Continued)

OTHER PUBLICATIONS

Henninger et al., "Biomechanical comparison of reverse total shoulder arthroplasty systems in soft tissue-constrained shoulders", Journal of Shoulder and Elbow Surgery, (2014), 23, e108-e117. (Year: 2014).*

(Continued)

*Primary Examiner* — Megan Y Wolf
(74) *Attorney, Agent, or Firm* — Haley Guiliano LLP

(57) ABSTRACT

Disclosed is a prosthetic joint assembly for joining a humerus bone to a scapula bone, comprising a humeral component adapted for engagement with said humerus bone and a concave dish; a scapular component adapted for engagement with said scapula bone and a convex surface adapted to engage said concave dish; wherein when said components are implanted and engaged in a rest position said prosthetic center of rotation is displaced in a direction that is inferior and medial relative to a natural center of rotation and said humerus bone is displaced in a direction that is inferior relative to said natural center of rotation.

14 Claims, 17 Drawing Sheets

(52) U.S. Cl.
CPC .............. *A61F 2002/30433* (2013.01); *A61F 2002/4022* (2013.01); *A61F 2002/4037* (2013.01); *A61F 2002/4062* (2013.01); *A61F 2002/4085* (2013.01)

(56) References Cited

U.S. PATENT DOCUMENTS

| | | | |
|---|---|---|---|
| 6,193,758 | B1 | 2/2001 | Huebner |
| 6,790,234 | B1 | 9/2004 | Frankle |
| 8,246,687 | B2 * | 8/2012 | Katrana ............... A61F 2/4059 623/19.13 |
| 10,583,012 | B1 | 3/2020 | Longobardi |
| 2004/0220673 | A1 | 11/2004 | Pria |
| 2009/0192621 | A1 * | 7/2009 | Winslow ............... A61F 2/4059 623/19.14 |
| 2012/0209392 | A1 | 8/2012 | Angibaud |
| 2013/0325131 | A1 | 12/2013 | Exactech |
| 2016/0228234 | A1 | 8/2016 | Hansen |
| 2016/0262902 | A1 | 9/2016 | Winslow et al. |
| 2018/0064546 | A1 * | 3/2018 | Rosa ..................... A61F 2/40 |
| 2020/0237519 | A1 * | 7/2020 | Ball ...................... A61F 2/4612 |
| 2021/0369465 | A1 | 12/2021 | Simoes et al. |
| 2022/0151794 | A1 * | 5/2022 | Fattori ................. A61F 2/4081 |
| 2022/0395376 | A1 | 12/2022 | Poon et al. |
| 2023/0114073 | A1 * | 4/2023 | Perego .................. A61F 2/4081 29/57 |

FOREIGN PATENT DOCUMENTS

| | | |
|---|---|---|
| WO | WO2020249720 | 12/2020 |
| WO | 2023/008942 A1 | 2/2023 |

OTHER PUBLICATIONS

Mulieri et al., "DJO Surgical Reverse Shoulder Prosthesis (RSP™)" Reverse Shoulder Arthroplasty. Cham: Springer International Publishing, 2015. 343-356. Web. (Year: 2015).*

Henninger, H., Burks, R., Tashjian, R. / "A Biomechanical Comparison of Reverse Total Shoulder Arthroplasty Systems" / Orthopaedic Proceedings—vol. 95-B, No. SUPP_34 / Published online Feb. 21, 2018 / US.

Saltzman / "A method for documenting the change in center of rotation with reverse total shoulder arthroplasty and ts application to a consecutive series of 68 shoulders having reconstruction with one of two different reverse prostheses" / J Shoulder Elbow Surg (2010) 19, 1028-1033 / US.

International Application No. PCT/US22/70381—Patent Cooperation Treaty PCT International Search Report—Completed Jun. 14, 2022 (mailed Jul. 5, 2022).

International Application No. PCT/US22/70381—Patent Cooperation Treaty PCT Written Opinion of the International Searching Authority—Completed Jun. 14, 2022 (mailed Jul. 5, 2022).

H. B. Henninger, et al. "Effect of deltoid tension and humeral version in reverse total shoulder arthroplasty: a biomechanical study" Elsevier—J Shoulder Elbow Surg (2012) 21, 483-490—2012 Journal of Shoulder and Elbow Surgery Board of Trustees.

N.A. Sharkey, et al. "The Rotator Cuff Opposes Superior Translation of the Humeral Head" The American Journal of Sports Medicine, vol. 23, No. 3—1995 The American Academy of Sports Medicine.

Israeli Office Action for Patent Application No. 304666 dated Oct. 30, 2024.

European Search Report and Opinion for Application No. EP 22746909.5—Sep. 12, 2024.

Heifner, et al. / Morphometry of the proximal humerus and the relationship to global offset / Seminars in Arthroplasty xxx (2024) / 1-8 pgs. / Published by Elsevier Inc. on behalf of American Shoulder and Elbow Surgeons.

Office Action received for European Application No. 22746909, mailed on May 23, 2025, 4 pages.

International Application No. PCT/US2024/046003—Patent Cooperation Treaty PCT International Search Report and the Written Opinion of the International Searching Authority—Completed Jan. 17, 2025 (mailed Jan. 28, 2025).

Japanese Patent Application No. 2023-543004—Office Action dated Mar. 18, 2025.

* cited by examiner

REVERSE SHOULDER PROSTHESIS AND RELATED METHODS

CLAIM OF PRIORITY

This application is being filed as a non-provisional patent application under 35 U.S.C. § 111(b) and 37 CFR § 1.53(c). This application claims priority under 35 U.S.C. § 119(e) to U.S. provisional patent application Ser. No. 63/142,344 filed on Jan. 27, 2021, the contents of which are incorporated herein by reference.

FIELD OF INVENTION

The invention relates generally to prosthetic implants and in particular to prosthetic implants for use in a total shoulder replacement procedure.

BACKGROUND OF THE INVENTION

FIGS. 1 and 2 illustrate the features of the normal human shoulder in the rest and abducted position respectively. The human shoulder joint is formed where the head (2) of the humerus (upper arm) bone (4) engages the glenoid cavity (5) of the scapula (shoulder blade) bone (6). In normal functioning of a healthy shoulder, the articular surface of the humeral head (2) fits into the glenoid cavity (5) like a ball and socket, allowing the humerus (4) to freely swivel with respect to the scapula (6) while being retained within the shoulder joint. This swiveling motion occurs about a center of rotation (8) (hereinafter "natural center of rotation" or "nCOR") between the humerus bone (4) and the scapula bone (6) which is usually located at or near the center of the humeral head (2). In a healthy shoulder the upper movement of the humerus (4) (on the frontal plane) is bound by a protrusion of the scapula (6) called the acromion (10), and in particular by a feature of the scapula called the coracoid process (12). Furthermore, in a healthy shoulder the humeral head (2) is retained within the glenoid cavity (5) by a complex of muscles and tendons commonly referred to as the rotator cuff (not shown for clarity) which surround and stabilize the shoulder joint.

Due to injury, trauma, degenerative changes, disease (such as arthritis) or other conditions, a person may experience pain, discomfort, or difficulty when operating the shoulder through its range of motion or may not be able to operate the shoulder at all. In certain situations, shoulder joint conditions may be addressed through a partial replacement of the joint. In a partial replacement, the head (2) of the humerus (4) is replaced by a prosthetic implant, while the glenoid cavity (5) is left relatively intact. In many cases, however, because the glenoid cavity (5) is too deteriorated or damaged to engage and hold the head (2) of the humerus (4), a partial replacement is not advised or possible.

In such cases, where a partial replacement is not possible, one available treatment is to replace the head (2) of the humerus (4) as well as the glenoid cavity (5) with a prosthetic shoulder in a procedure commonly referred to as a total shoulder replacement. Moreover, because in most situations where a total shoulder replacement is required the rotator cuff is also damaged and unable to stabilize the head (2) of the humerus (4) within the glenoid cavity (5), the configuration of the components in the total shoulder prosthesis is reversed. That is, in a reverse total shoulder prosthesis, the component implanted on the scapula, (corresponding to the glenoid cavity (5)) is convex, or ball-shaped, while the component implanted on the head (2) of the humerus (4) is concave, or socket-shaped. Such reverse configuration has been found to be more stable in the absence of a fully healthy rotator cuff.

Although previous efforts have been made to develop reverse total shoulder prostheses, they have met often with disappointing results. Presently available reverse total shoulder prostheses provide too limited a range of motion, dislocate too easily, place too much stress on bones resulting in failure of the prostheses, bone fractures, or both, cause complications such as infections, and wear prematurely requiring additional surgeries during the patient's lifetime, among other flaws. In addition, the methods presently used for implanting such prosthetic shoulder joints often result in poorly aligned joints and poor joint performance and range of movement.

Accordingly, there is a need in the art for a reverse total shoulder prosthesis, and associated methods for implanting same, which provides a patient with a range of motion and alignment that approximates that of a healthy shoulder, is long-lasting, provides adequate support for the remaining upper arm and chest bones, and avoids some or all of the drawbacks of existing prosthetic shoulders.

SUMMARY OF THE INVENTION

It has been determined by the inventors herein that the deficiencies in existing total reverse shoulder prostheses are primarily due to (a) the improper location of the center of rotation between the prosthetic scapular and humeral components (hereinafter the "prosthetic center of rotation" or "pCOR"); and (b) improper absolute placement of the humeral bone relative to the scapula once the prosthesis is in place.

The present invention provides a novel reverse total shoulder prosthesis that once implanted properly places the pCOR and humeral bone in order to provide an optimally functioning prosthetic shoulder joint. More specifically, the pCOR is placed in a position that is medial and inferior to the position of the nCOR. Additionally, for optimal placement, the humerus is translated in a direction that is inferior to the location of the nCOR.

Referring to FIG. 3, which shows a close-up view of the interface between the scapula (6) and humerus bone (4), the inventors have determined through experimentation and simulation that the vector (20) of translation of the natural center of rotation (8) to the optimal pCOR location (22) includes a range of ratios between the inferior (24) and medial (26) components of that vector (20). That range of ratios between the inferior (24) and medial (26) components of the vector of translation of the center of rotation (20) is between 0.6 and 1.2 (resulting in an angle range of between 30 and 50 degrees below horizontal), with a preferred ratio being between 0.85 and 1.15 (resulting in an angle range of between 40 and 49 degrees below horizontal). The optimal solution in most cases is one where the medial (26) and inferior (24) components are equal, or have a ratio of 1 (resulting in an angle of 45 degrees below horizontal). The optimal magnitude of the vector of translation of the center of rotation (20) similarly has a range, which is between 60% and 80% of the radius (28) of the humeral head (2) of the patient. In most cases the optimal magnitude of the vector of translation of the center of rotation (20) is about 70% of the radius (28) of the humeral head (2) of the patient.

The inventors have similarly determined that the vector of translation of the humerus (30) in the inferior direction with respect to the nCOR (8) has a direction angle (32) between 75 and 105 degrees below horizontal. In most cases, the optimal solution occurs where the vector of translation of the humerus (30) is 90 degrees below horizontal. The optimal magnitude of the vector of translation of the humerus (30) similarly has a range, which is between 80% and 120% of the radius (28) of the humeral head (2) of the patient. In most cases the optimal magnitude of the vector of translation of the humerus (30) is about 100% of the radius (28) of the humeral head (2) of the patient.

Accordingly, disclosed is a prosthetic joint assembly for joining a humerus bone to a scapula bone, the humerus and scapula bones having a natural center of rotation relative to each other, the humerus bone having a humeral head diameter, the humerus bone being positionable with respect to the scapula bone between a rest position and an abducted position, the prosthetic joint assembly comprising a humeral component having two opposite ends, the first end comprising a humeral stem adapted for rigid engagement with the humerus bone and the second end comprising a concave dish; a scapular component having two opposite sides, the first side comprising a scapular base adapted for rigid engagement with the scapula bone and the second side comprising a convex surface adapted to engage the concave dish; wherein when the concave dish and the convex surface are engaged, the humeral component freely swivels with respect to the scapular component about a prosthetic center of rotation; wherein when the humeral stem is engaged with the humerus bone, the scapular stem is engaged with the scapula bone, and the concave dish and the convex surface are engaged, the prosthetic center of rotation is displaced in a direction that is inferior and medial relative to the natural center of rotation; wherein when the humeral stem is engaged with the humerus bone, the scapular stem is engaged with the scapula bone, and the concave dish and the convex surface are engaged, with the humerus in the rest position, the humerus bone is displaced in a direction that is inferior relative to the natural center of rotation; wherein the direction of displacement of the humerus bone is between 75 and 105 degrees below horizontal; wherein the ratio of the inferior displacement of the prosthetic center of rotation to the medial displacement of the prosthetic center of rotation is in the range between 0.6 and 1.2 (30-50 degrees below horizontal), preferably in the range of 0.85 to 1.15 (40-49 degrees below horizontal), and optimally equal to 1 (45 degrees below horizontal); wherein the distance of displacement of the prosthetic center of rotation relative to the natural center of rotation is between 60% and 80%, and optimally equal to 70%, of the radius of the humeral head; and wherein the distance of displacement of the humerus bone relative to the natural center of rotation is between 80% and 120%, and optimally equal to 100%, of the radius of the humeral head.

Also disclosed is a prosthetic joint assembly for joining a humerus bone to a scapula bone, the humerus and scapula bones having a natural center of rotation relative to each other, the humerus bone having a humeral head diameter, the humerus bone being positionable with respect to the scapula bone between a rest position and an abducted position, the prosthetic joint assembly comprising a humeral component having two opposite ends, the first end comprising a humeral stem adapted for rigid engagement with the humerus bone and the second end comprising a concave surface; a scapular baseplate having a vertical dimension and two opposite sides, the first side adapted for rigid engagement with the scapula bone, and the second side comprising a trunnion, the trunnion being offset inferiorly relative to a center of the vertical dimension; a glenosphere component having two opposite sides, the first side comprising an aperture adapted for rigid engagement with the trunnion, and the second side comprising a convex surface adapted to engage the concave surface; wherein when the concave surface and the convex surface are engaged the humeral component freely swivels with respect to the glenospheres about a prosthetic center of rotation. In this embodiment, the humeral component optionally comprises a stem component having a longitudinal axis and two opposite ends, the first end comprising the humeral stem, and the second end comprising a coupler interface; a coupler component having two opposite ends, the first end comprising a stem interface adapted to rigidly engage the stein component's coupler interface, and the second end comprising a cup interface; and a cup component having two opposite sides, the first side comprising a coupler interface adapted to rigidly engage the coupler component's cup interface, and the second side comprising the concave surface.

Also disclosed is a method for prosthetically joining a humerus bone to a scapula bone, the humerus and scapula bones having a natural center of rotation relative to each other, the humerus bone having a humeral head diameter, the humerus bone being positionable with respect to the scapula bone between a rest position and an abducted position, the method comprising the steps of (1) rigidly engaging a scapular component to the scapula bone; (2) rigidly engaging a humeral component to the humerus bone, the humeral component adapted to engage, and freely swivel with respect to, the scapular component about a prosthetic center of rotation; (3) wherein upon engagement of the humeral component to the scapular component, the prosthetic center of rotation is displaced in a direction that is inferior and medial relative to the natural center of rotation; (4) wherein upon engagement of the humeral component to the scapular component in the rest position, the humerus bone is displaced in a direction that is inferior relative to the natural center of rotation; (5) wherein the direction of displacement of the humerus bone is between 75 and 105 degrees below horizontal, and optimally 90 degrees below horizontal; (6) wherein the ratio of the inferior displacement of the prosthetic center of rotation to the medial displacement of the prosthetic center of rotation is in the range between 0.6 and 1.2 (30-50 degrees below horizontal), preferably in the range of 0.85 and 1.15 (40-49 degrees below horizontal); and optimally equal to 1 (45 degrees below horizontal); (7) wherein the distance of displacement of the prosthetic center of rotation relative to the natural center of rotation is between 60% and 80%, and optimally 70%, of the radius of the humeral head; and (8) wherein the distance of displacement of the humerus bone relative to the natural center of rotation is between 80% and 120%, and optimally equal to 100%, of the radius of the humeral head.

Although the invention is illustrated and described herein as embodied in a shoulder prosthesis, it is nevertheless not intended to be limited to only the details shown, since various modifications and structural changes may be made therein without departing from the spirit of the invention and within the scope and range of equivalents of the claims. Moreover, many of the principles and techniques discussed in the following description can be applied to prostheses used in other joints in the human anatomy.

The construction of the invention, together with additional objects and advantages thereof will be best understood from the following description of the specific disclosed embodiments when read in connection with the accompanying drawings.

DETAILED DESCRIPTION OF THE INVENTION

Figure 3:
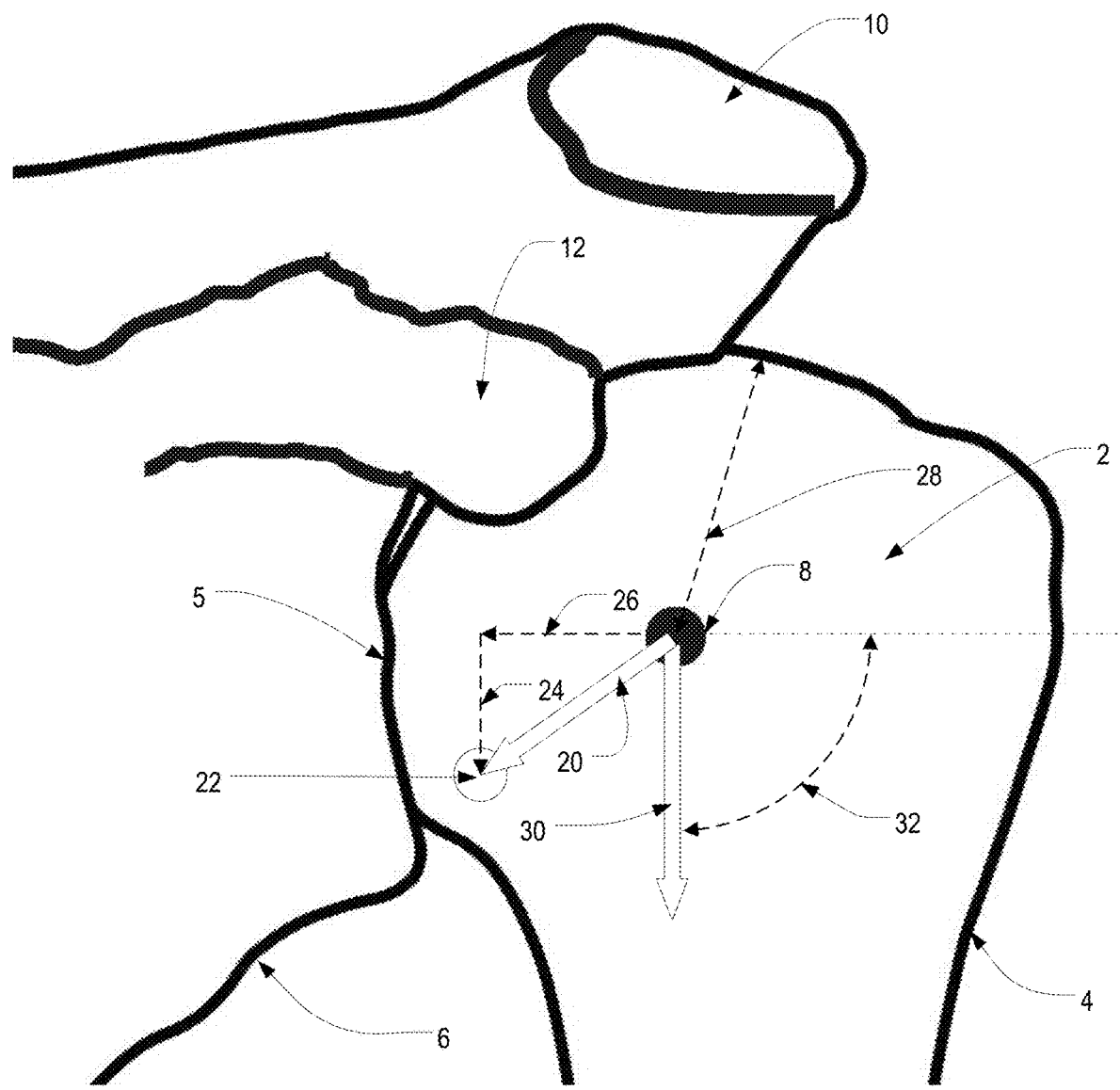
FIG. 3 is a close-up view of the interface between the human scapula and humerus bones illustrating the relocation of the center of rotation and humeral bone position in accordance with the present invention.

An object of the prosthesis herein disclosed is to achieve the optimal final placement of the pCOR and the humerus bone as explained in detail in the previous sections and as illustrated in FIG. 3. FIG. 3 is a close-up illustration of the interface between the humerus and scapula showing the vectors of translation, and final placement, of the pCOR and the humerus bone. This optimal positioning is achieved by utilizing a scapular component (100) and humeral components (200) described in detail in the following paragraphs.

Figure 4:
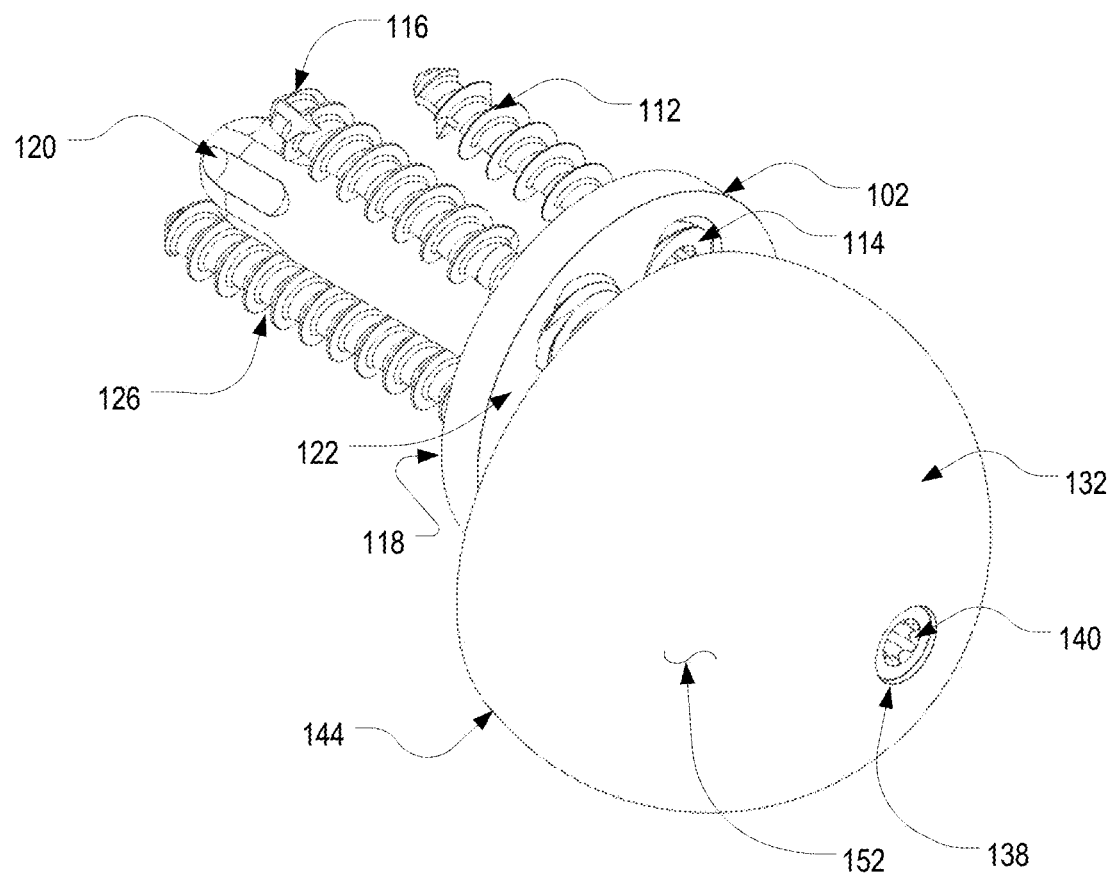
FIG. 4 is an isometric view of the scapular component of a shoulder prosthesis according to the present invention.
Figure 5:
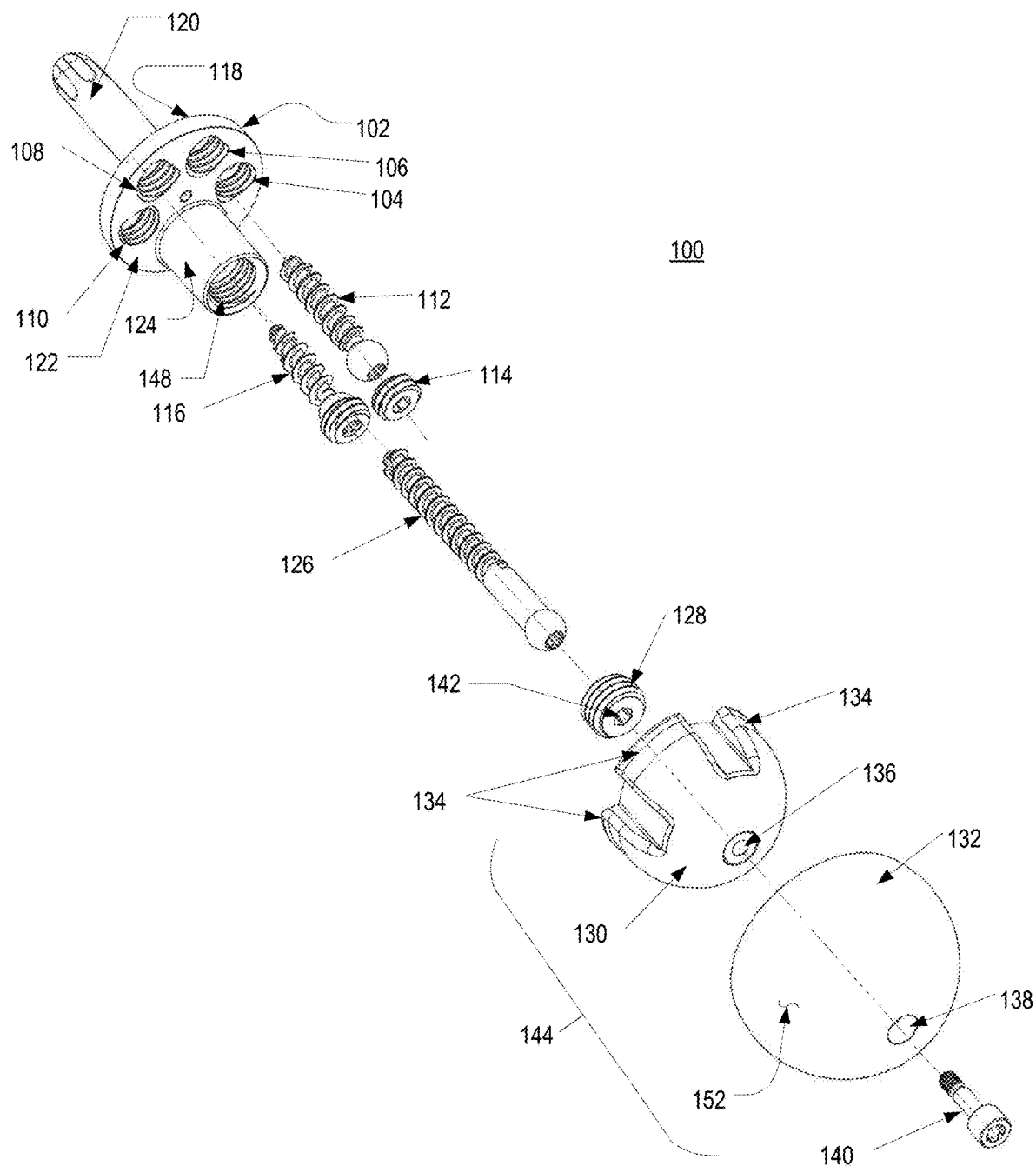
FIG. 5 is an exploded orthographic view of the scapular component of the shoulder prosthesis shown in FIG. 4.
Figure 6:
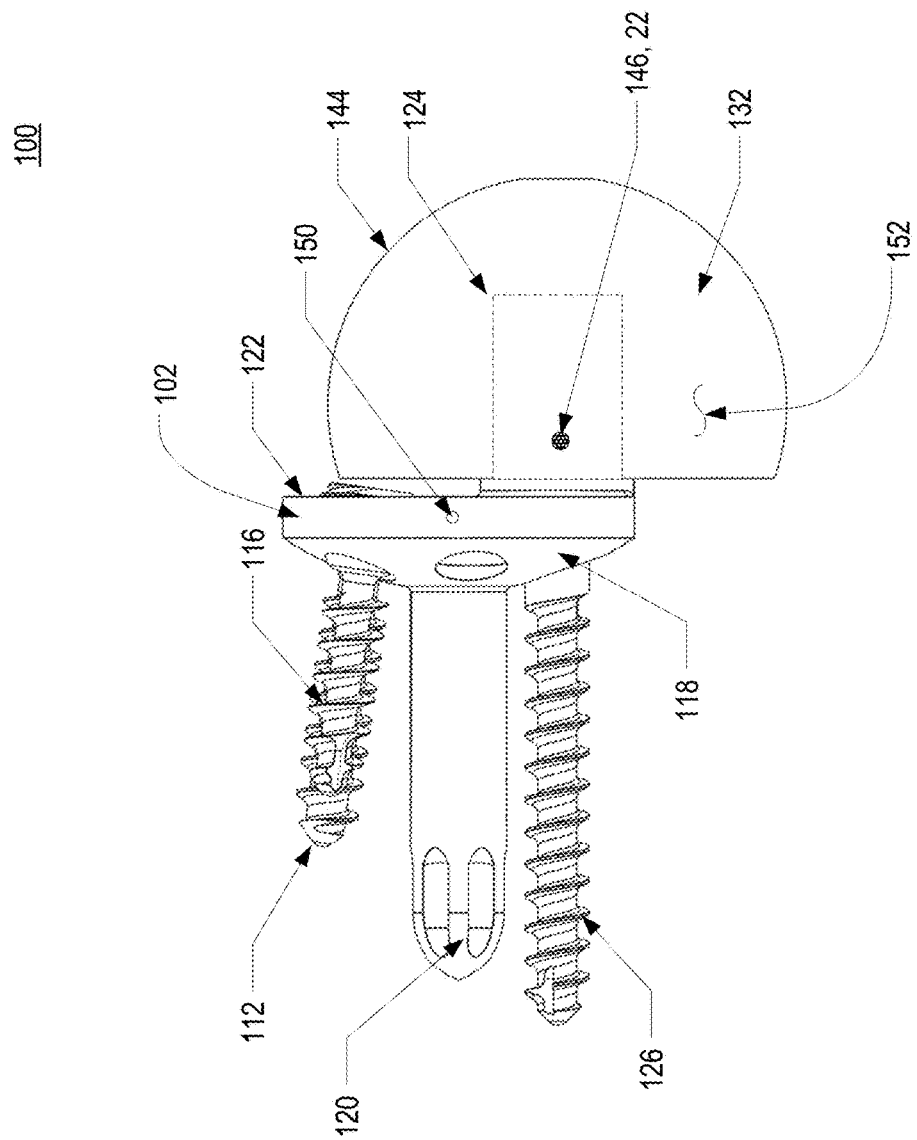
FIG. 6 shows a side view of the scapular component of a shoulder prosthesis shown in FIG. 4.

Referring to FIGS. 4, 5, and 6 shown are, respectively, isometric, exploded, and side views fully describing the construction of the scapular component (100). Scapular component (100) comprises a base (102) which is adapted for rigid engagement to the glenoid (5) of the scapular bone (6) through one or more screw holes (104, 106, 108, 110). The screw holes are adapted to receive one or more polyaxial locking screws (112) with corresponding locking caps (114) or single-axis locking screws (116) to affix base (102) to the glenoid (5). The back side (118) of base (102) may optionally include a stem (120) adapted to be implanted into the glenoid (5) to provide additional torsional support for the scapular component (100).

The front side (122) of base (102) includes trunnion (124) of approximately cylindrical construction. The trunnion (124) can optionally be bored and include an internal thread (148) which is adapted to receive a single-axis locking screw (not shown) or a polyaxial locking screw (126) and a corresponding locking cap (128). The external surface of the trunnion (124) is adapted to receive a glenosphere core (130) which, in turn, is adapted to receive a hollow glenosphere cover (132). The glenosphere core (130) has one or more lobes (134) that closely correspond to matching apertures in the glenosphere cover (132), which ensure that the glenosphere cover (132) does not rotate with respect to the glenosphere core (130) once assembled. When assembled, the glenosphere core (130) and glenosphere cover (132) comprise a spherically shaped glenosphere assembly (144) with an outside surface (152) adapted to interface with humeral component (200).

The glenosphere core (130) and glenosphere cover (132) feature screw holes (136, 138) that are aligned with trunnion (124) and locking cap (128), and are adapted to receive setting screw (140) to secure the glenosphere assembly (144) to the base (102). The back of locking cap (128) is equipped with internal threads (142) that correspond with the external threads of setting screw (140) for that purpose. In the event that the trunnion (124) is not bored and therefore does not accept polyaxial locking screw (126) and locking cap (128), a hole with internal threads can be placed at the tip of the trunnion (124) to engage with setting screw (140). Although a two-piece glenosphere assembly (144) is shown in the described embodiment, it should be understood that a single piece glenosphere (not shown) can optionally be used with similar effectiveness.

With the exception of the glenosphere cover (132), all of the components of the scapular component (100) are, preferably, of metallic composition, such as, without limitation, biocompatible surgical-grade alloys like cobalt-chromium-molybdenum ("CoCrMo") or Titanium alloys well suited for biomedical applications such as joint replacements. Glenosphere cover (132) is manufactured from a durable yet resilient plastic material such as, without limitation, ultra-high-molecular-weight polyethylene ("UHMWPE.") If a single piece glenosphere is used, it can be of metallic or plastic construction.

As will be readily observed, trunnion (124) is located well inferior to the center (150) of base (102). This ensures that the center (146) of the glenosphere assembly (144) which will become the prosthetic center of rotation (22), is well inferiorized. Moreover, because center (146) of the glenosphere assembly (144) is located very close to base (102) it is also well medialized. As discussed previously, inferiorization and medialization of the prosthetic center of rotation (22) with respect to the natural center of rotation (8) is one of the primary objectives achieved by the described arrangement of components.

Figure 7:
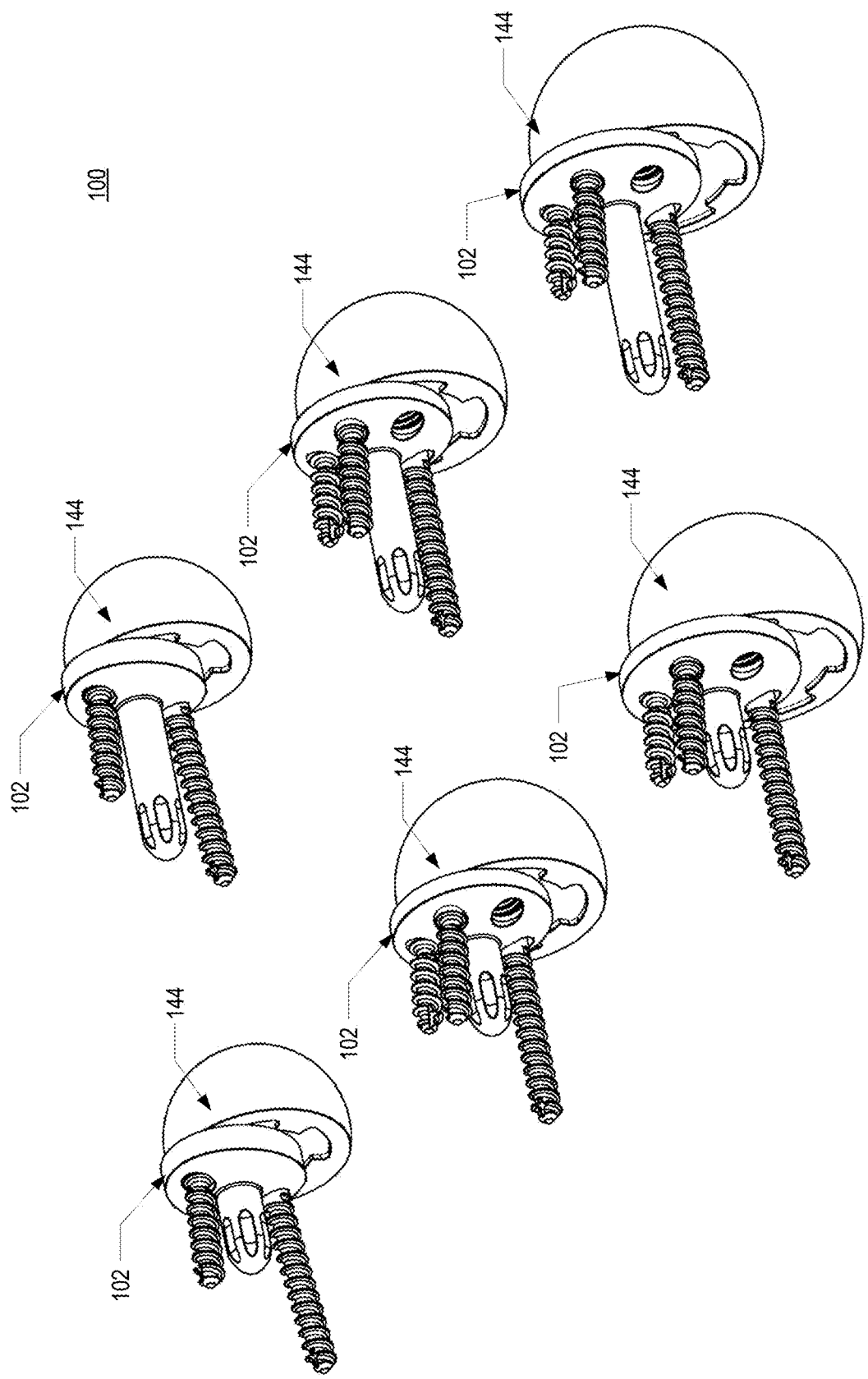
FIG. 7 shows multiple sized variations of the scapular component of a shoulder prosthesis according to the present invention.

Referring next to FIG. 7, shown are multiple sized variations of the scapular component (100) which can be utilized depending on the anatomy of the patient and the magnitude and angle of translation of the pCOR (22) desired by the surgeon. As will be seen, some of the sizes include a single attachment screw and corresponding base hole, while others include up to 4 holes and screws. In addition, the shape of the base (102) varies from circular to oval shaped. It should be observed that additional base (102) shapes can be used without departing from the principles of the disclosed invention. The described modular arrangement permits the use of differently sized glenosphere assemblies (144) with differently sized and shaped bases (102) to assemble a scapular component (100) which is optimally adapted to the anatomy of the patient and the desired prosthetic center of rotation (22) location.

Figure 8:
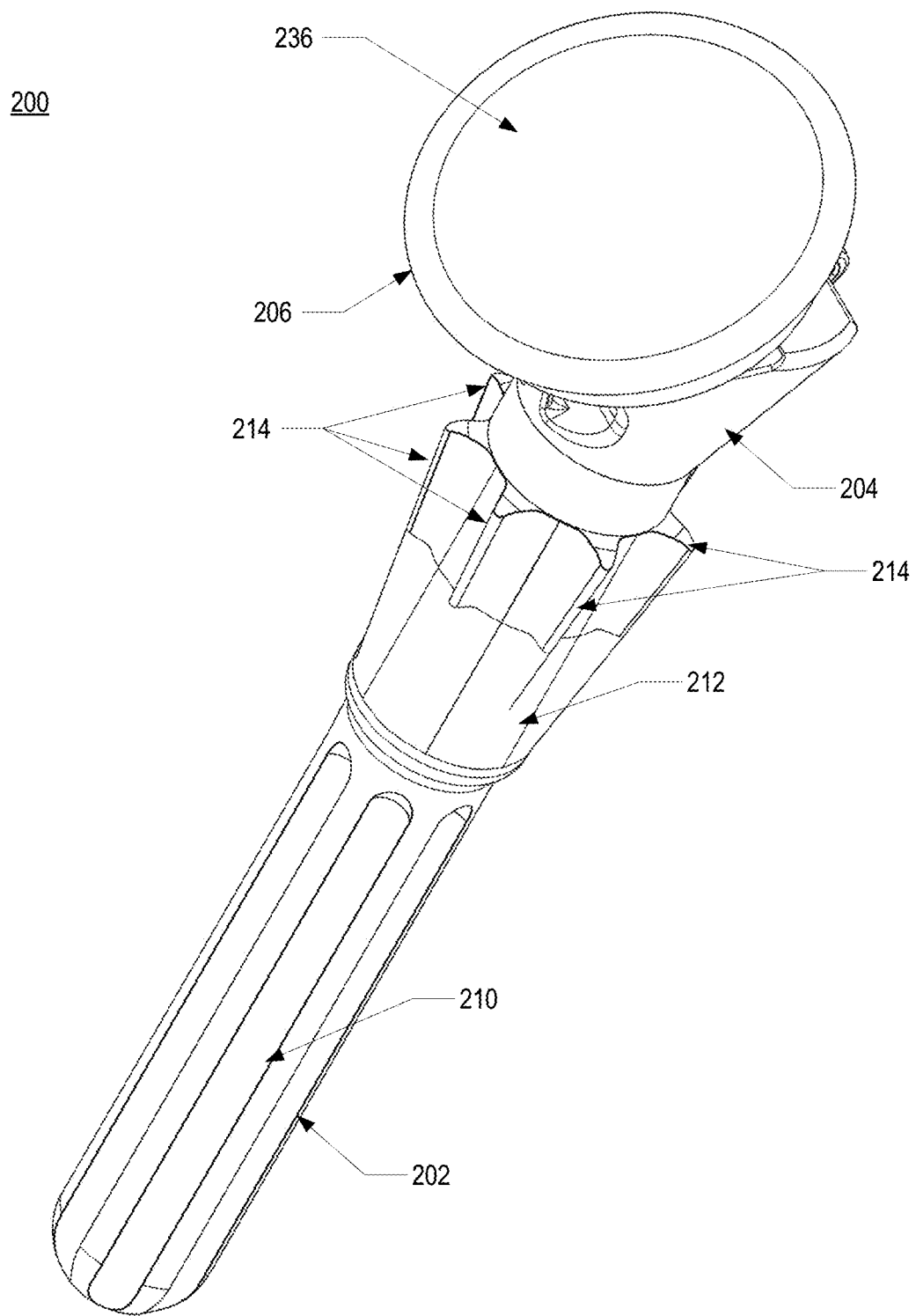
FIG. 8 is an isometric view of the humeral component of a shoulder prosthesis according to the present invention.
Figure 9:
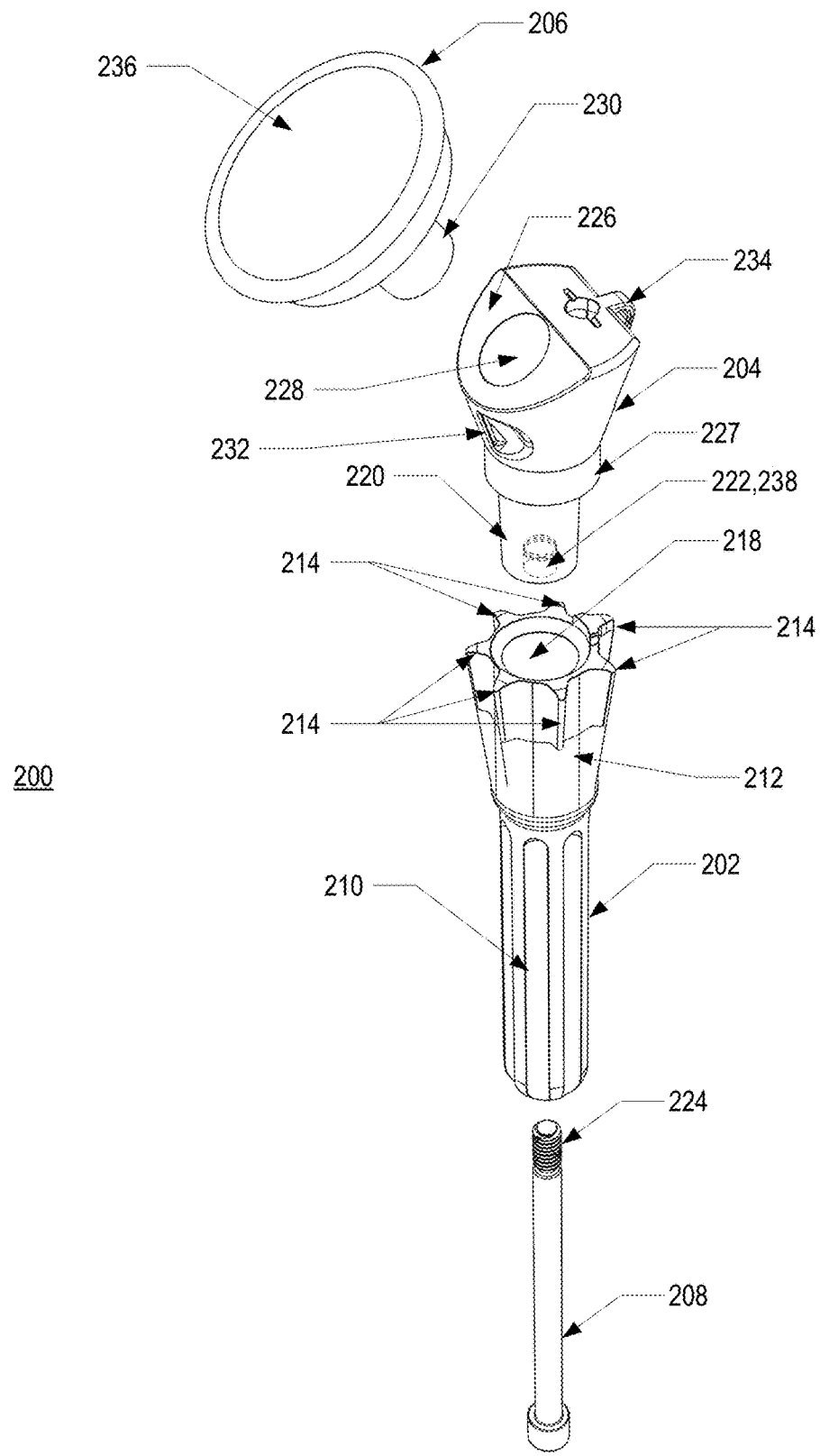
FIG. 9 is an exploded orthographic view of the humeral component of the shoulder prosthesis shown in FIG. 8.
Figure 10:
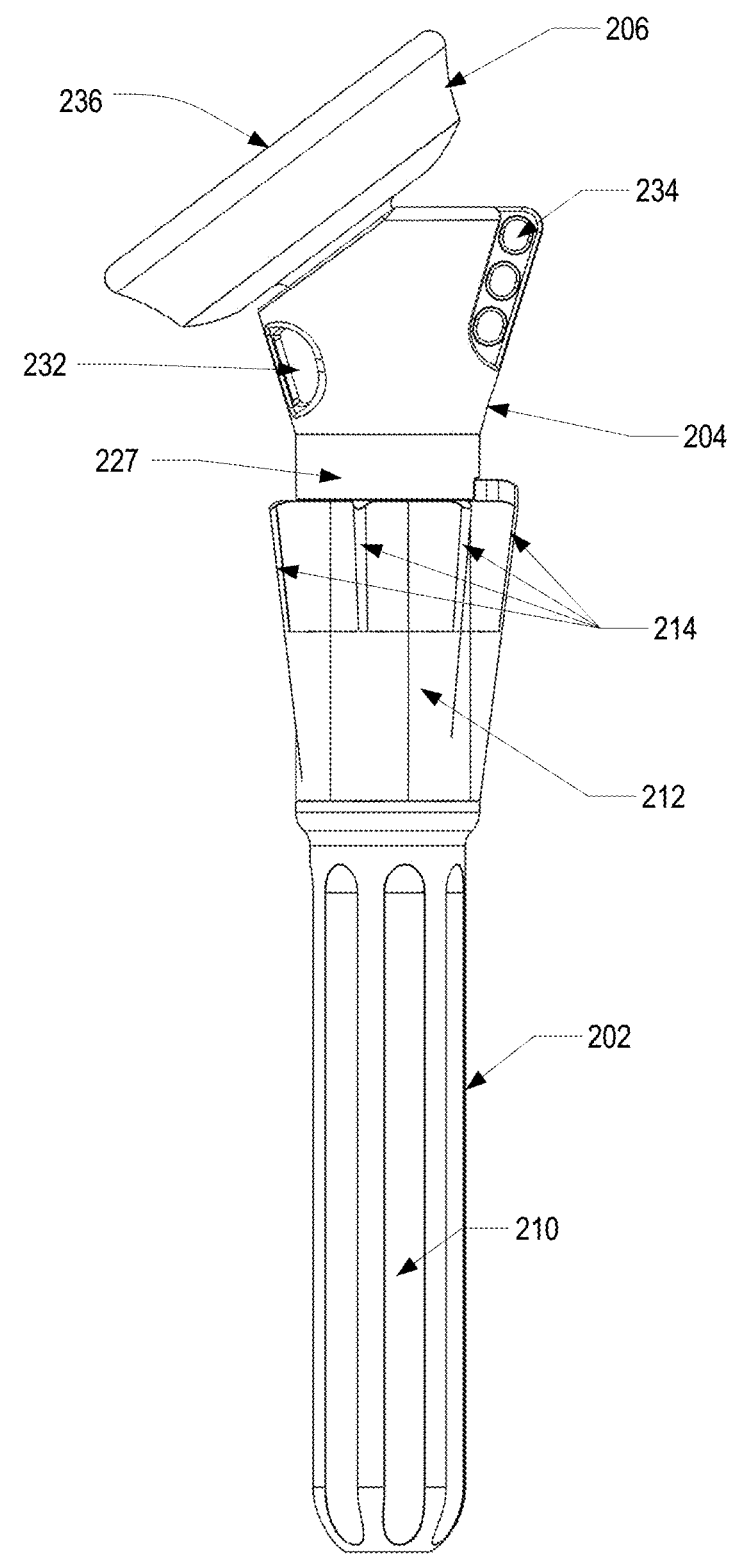
FIG. 10 shows a side view of the humeral component of a shoulder prosthesis shown in FIG. 8.

Referring to FIGS. 8, 9, and 10, shown are, respectively, isometric, exploded, and side views fully describing the construction of the humeral component (200). Humeral component (200) comprises a stem (202), a coupler (204), cup (206), and assembly screw (208). Stem (202) is a substantially elongated member comprising a medular stem (210) at one end, and a cone (212) at the other end. Stem (202) is bored through its longitudinal axis to permit assembly screw (208) to enter through the medular stem (210) end and engage coupler (204) at the cone (212) end. Medular stem (210) comprises a typical bone stem adapted to penetrate the medullary canal of the humerus bone (4) and rigidly engage the bone. Medular stem (210) can be adapted for cement or cementless applications. Cone (212) gradually expands in diameter and terminates in one or more fins (214) that are adapted to engage trabecular bone in the humerus bone (4) to transmit torsional loads and prevent stem (202) from rotating once implanted. The top portion of cone (212) comprises a stem shaft opening (218) adapted to receive coupler (204)

Coupler (204) comprises a stem engagement shaft (220) adapted to engage stem shaft opening (218) and form a secure interference or press fit between stem (202) and coupler (204). In addition, the bottom surface of stem engagement shaft (220) comprises an opening (222) with internal threads (238) that receive the threads (224) of assembly screw (208) after it is inserted through the bottom of the medular stem (210) end of stem (202). In one embodiment stem engagement shaft (220) and shaft opening (218) form a morse taper which provides for a secure frictional fit. In order to make the engagement between the stem (202) and coupler (204) even more secure against torsional forces, stem engagement shaft (220) can optionally be offset from the centerline of stem (202). The combination of a morse taper and the off-center location of stem engagement shaft (220) provide for an extremely robust and torsion resistant fit between stem (202) and coupler (204) once assembly screw (208) is tightened.

The top surface (226) of coupler (204) comprises a slanted landing area with an opening to receive cup (206). The angle of slant of top surface (226) provides the appropriate angle for displacement of the humerus (4) in the lateral-inferior direction in relation to the pCOR (22) once the prosthesis is assembled. An intermediate coupler section (227) provides additional inferiorization of the humerus bone (4) with respect to the pCOR (22) should it be necessary to achieve optimal placement of the humerus. A cup shaft opening (228) on top surface (226) is adapted to receive cup shaft (230) to secure cup (206) to coupler (204). Cup shaft opening (228) and cup shaft (230) may comprise another morse taper to ensure secure engagement between coupler (204) and cup (206). Additionally, coupler (204) may include one or more medial (232) and lateral (234) suture attachment points.

One end of cup (206) comprises a concave surface, or dish (236) which closely matches, and is adapted to engage, the outside surface (152) of glenosphere assembly (144) (see FIGS. 4-6.) The other end of cup (206) comprises cup shaft (230) which, as previously discussed, engages in an interference fit, and optionally a morse taper or other type of shallow angle self-holding taper, with cup shaft opening (228) to securely engage cup (206) to coupler (204).

All of the components of the humeral component (200) are, preferably, of metallic composition, such as, without limitation, biocompatible surgical-grade alloys like cobalt-chromium-molybdenum ("CoCrMo") or Titanium alloys well suited for biomedical applications such as joint replacements.

Figure 11:
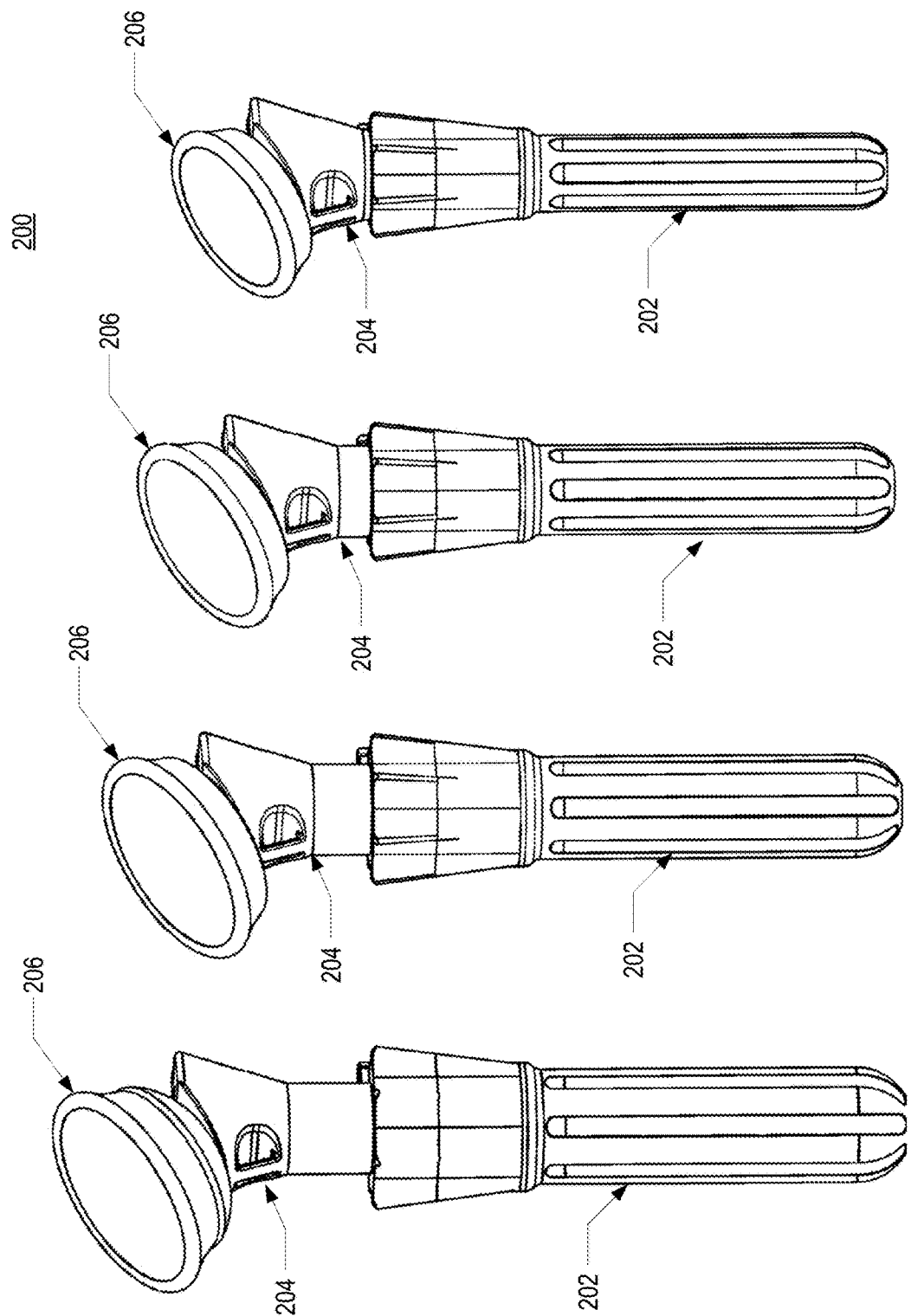
FIG. 11 shows multiple sized variations of the humeral component of a shoulder prosthesis according to the present invention.

Referring next to FIG. 11, shown are multiple sized variations of the humeral component (200) which can be utilized depending on the anatomy of the patient and the magnitude and angle of further translation of the humerus bone (4) desired by the surgeon. As will be seen, the various sizes include stems (202) of different diameters, cones (212) with varying tapers, intermediate coupler sections (227) of varying lengths, and concave surfaces or dishes (236) of different diameters and curvatures to match corresponding glenosphere assemblies (144). The described modular arrangement permits the use of differently sized stems (202) with differently sized couplers (204) and cups (206) to assemble a humeral component (200) which is optimally adapted to the anatomy of the patient and the optimal displacement of the humerus bone (4) with respect to the prosthetic center of rotation (22).

The procedure for implanting the disclosed prosthetic shoulder on a patient includes the following generalized steps. First, the size and relative postion of the humerus (4), humeral head (2), scapula (6), glenoid (5), and natural center of rotation (8) of the patient's anatomy are measured. Next, based on these measurements, a scapular component (100), and a humeral component (200), are assembled using the various modular elements, including appropriately sized base (102), glenosphere assembly (144), stem (202), coupler (204), and cup (206) elements. Then, the glenoid (5) is prepared to receive the scapular component (100) which is implanted at the appropriate location to achieve the desired level of inferiorization of the pCOR (22). Next, the humeral head is removed from the humerus (4) and the humeral component (200) is implanted in its place. Finally the scapular component (100) and humeral component (200) are mated and the shoulder joint is tested going from the at rest position to the abducted position and back. If any impingement is detected between the humerus and scapula one or more of the modular elements of the scapular component (100) or the humeral component (200) can be replaced to achieve an optimal alignment of the shoulder joint.

Figure 12:
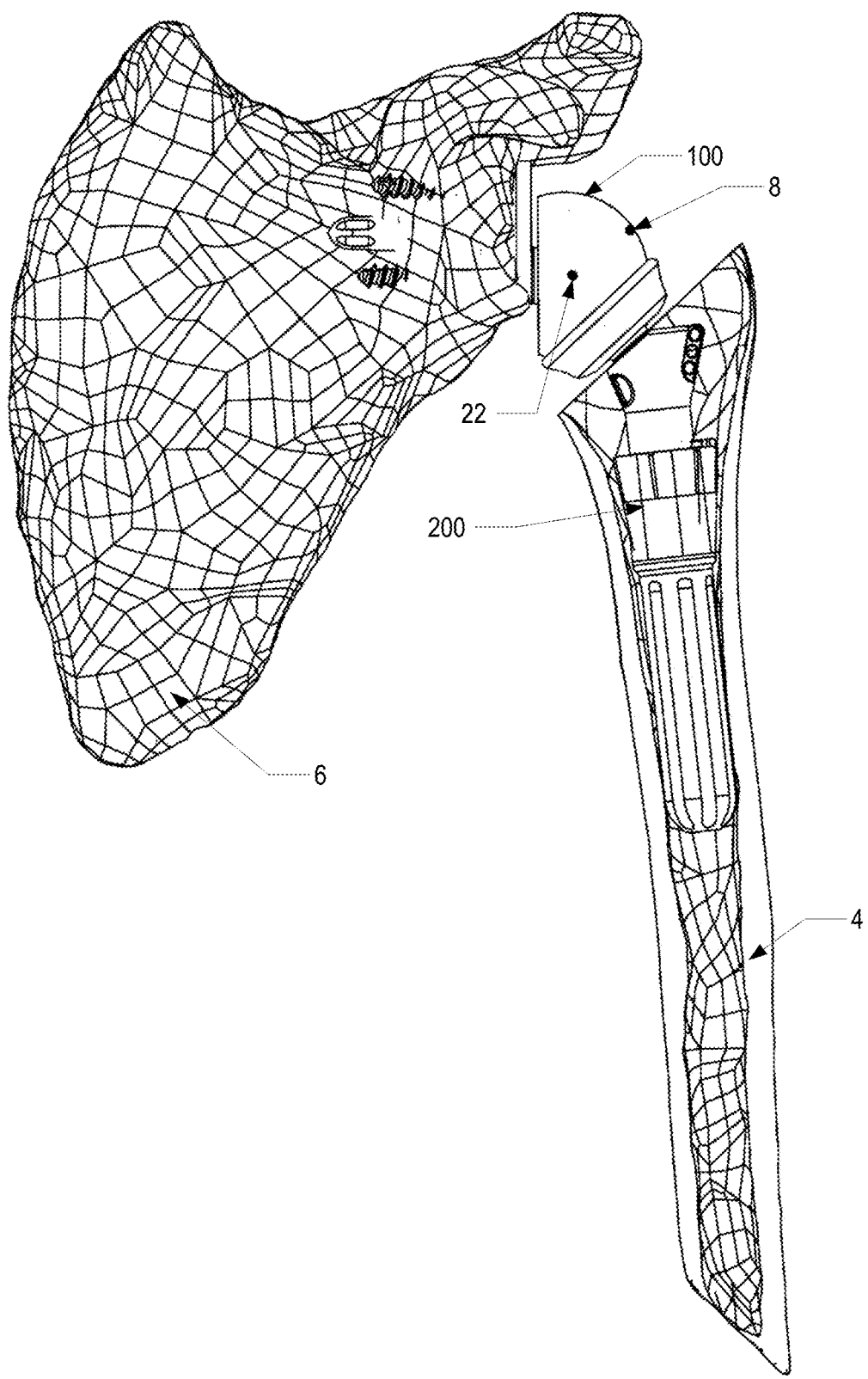
FIG. 12 shows, in the rest position, a shoulder prosthesis according to the present invention implanted on human scapula and humerus bones.
Figure 13:
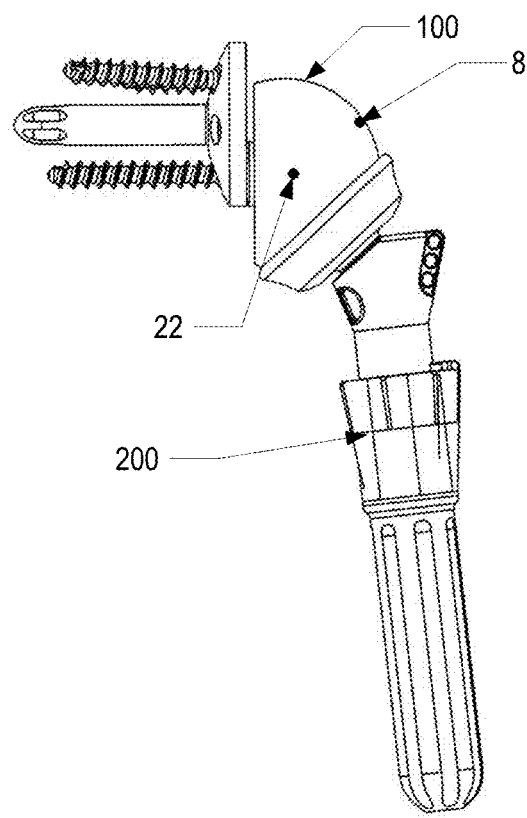
FIG. 13 shows the shoulder prosthesis of FIG. 12 with the humerus and scapula bones removed for clarity.

FIGS. 12 and 13 show views of the presently disclosed prosthetic shoulder joint, fully assembled and implanted in the "at rest" position. Shown in FIG. 12 is an assembled shoulder prosthesis according to the present invention implanted on human scapula (6) and humerus (4) bones. FIG. 13 shows the same assembled prosthesis, including the scapular component (100) and the humeral component (200), with the bones not shown for added clarity. It should be noted that the prosthetic center of rotation (22) is significantly shifted in the medial and inferior direction with respect to the natural center of rotation (8) and that the humerus bone (4) is similarly significantly further shifted in the inferior direction with respect to the natural center of rotation (8). This arrangement positions the humerus bone (4) in the optimal placement for full rotation to the abducted position with minimized risk of impingement on any features of the scapula (6).

Figure 1:
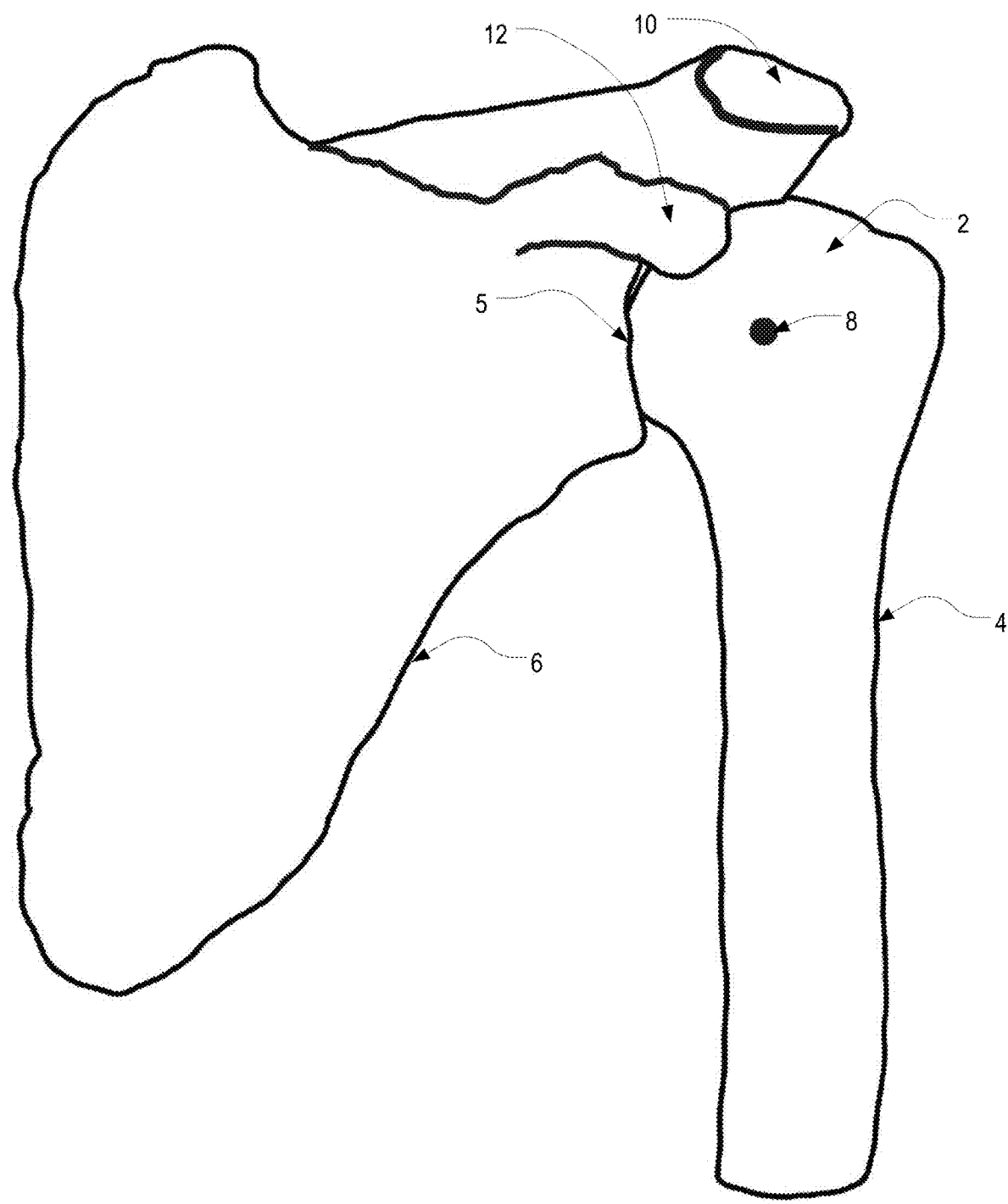
FIG. 1 is an illustration of the bones of the human shoulder in the rest position provided for reference and to illustrate the principles of operation of the present invention.
Figure 2:
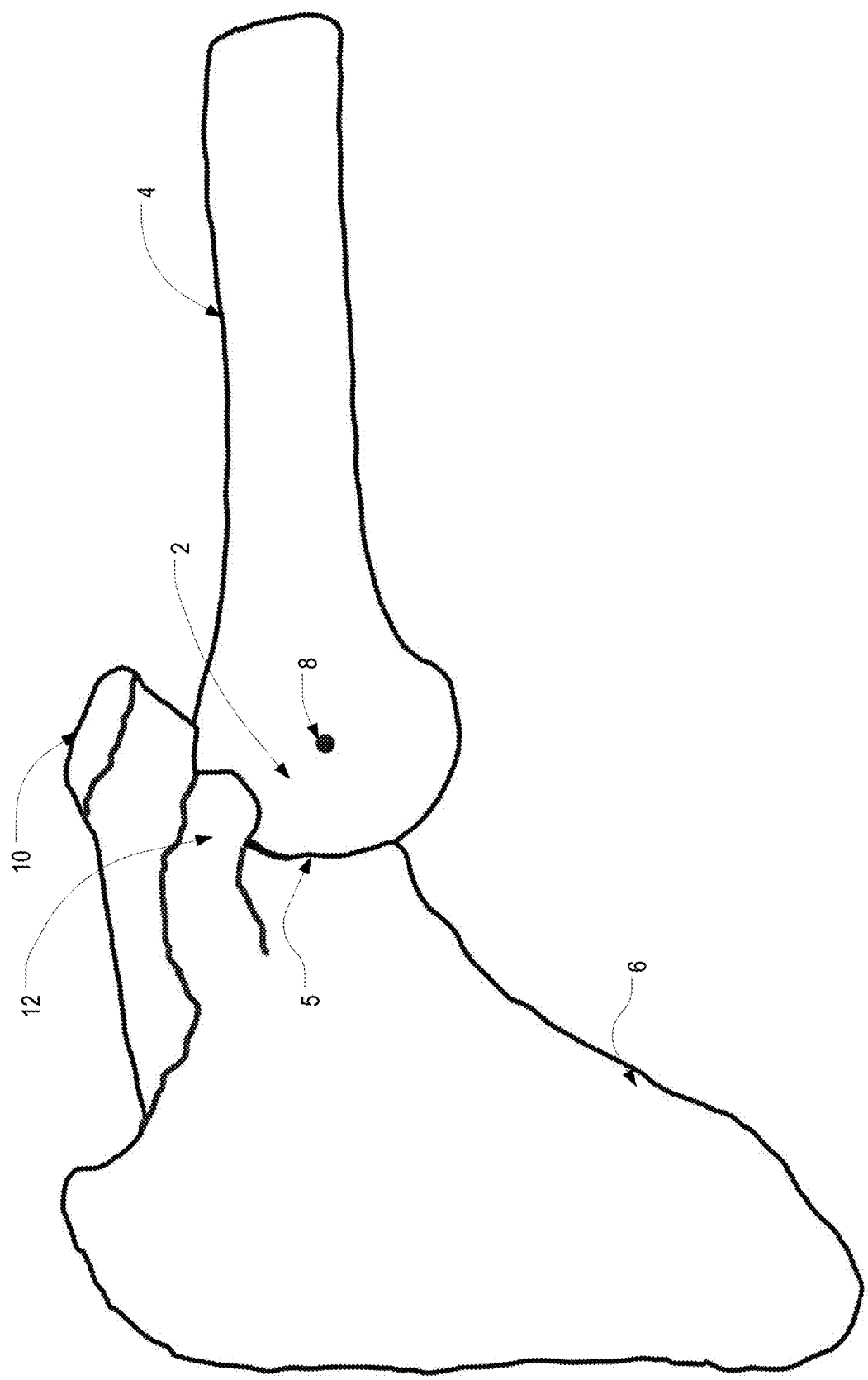
FIG. 2 is an illustration of the bones of the human shoulder in the abducted position provided for reference and to illustrate the principles of operation of the present invention.
Figure 14:
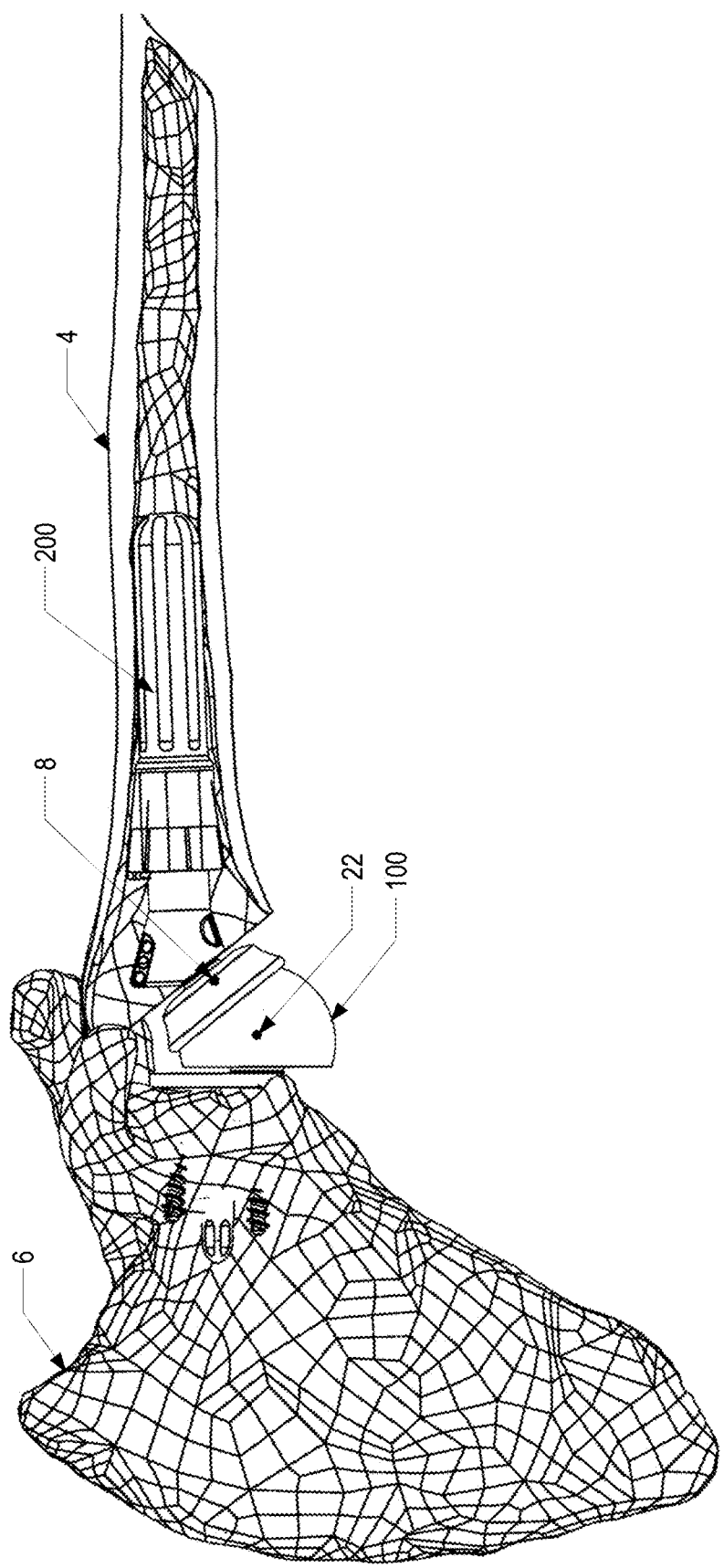
FIG. 14 shows, in the abducted position, a shoulder prosthesis according to the present invention implanted on human scapula and humerus bones.
Figure 15:
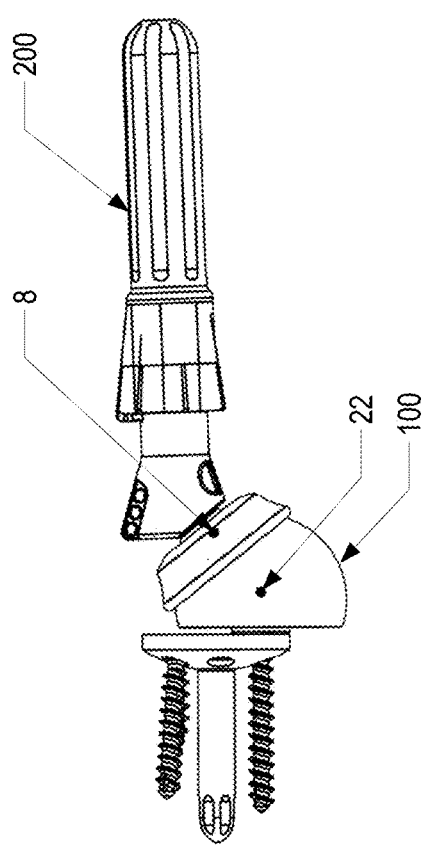
FIG. 15 shows the shoulder prosthesis of FIG. 14 with the humerus and scapula bones removed for clarity.

Next FIGS. 14 and 15 show views of the presently disclosed prosthetic shoulder fully assembled and implanted after rotation to the "abducted" position. Shown in FIG. 14 is an assembled shoulder prosthesis according to the present invention implanted on human scapula (6) and humerus (4) bones. FIG. 15 shows the same assembled prosthesis, including the scapular component (100) and the humeral component (200), with the bones not shown for added clarity. As will be appreciated, the prosthetic center of rotation (22) remains significantly shifted in the medial and inferior direction with respect to the natural center of rotation (8). In the abducted position, the humerus bone (4) is now in almost the same position as it would be in a healthy shoulder (see FIG. 2) reflecting the almost complete restoration of the range of movement of the shoulder.

Figure 16:
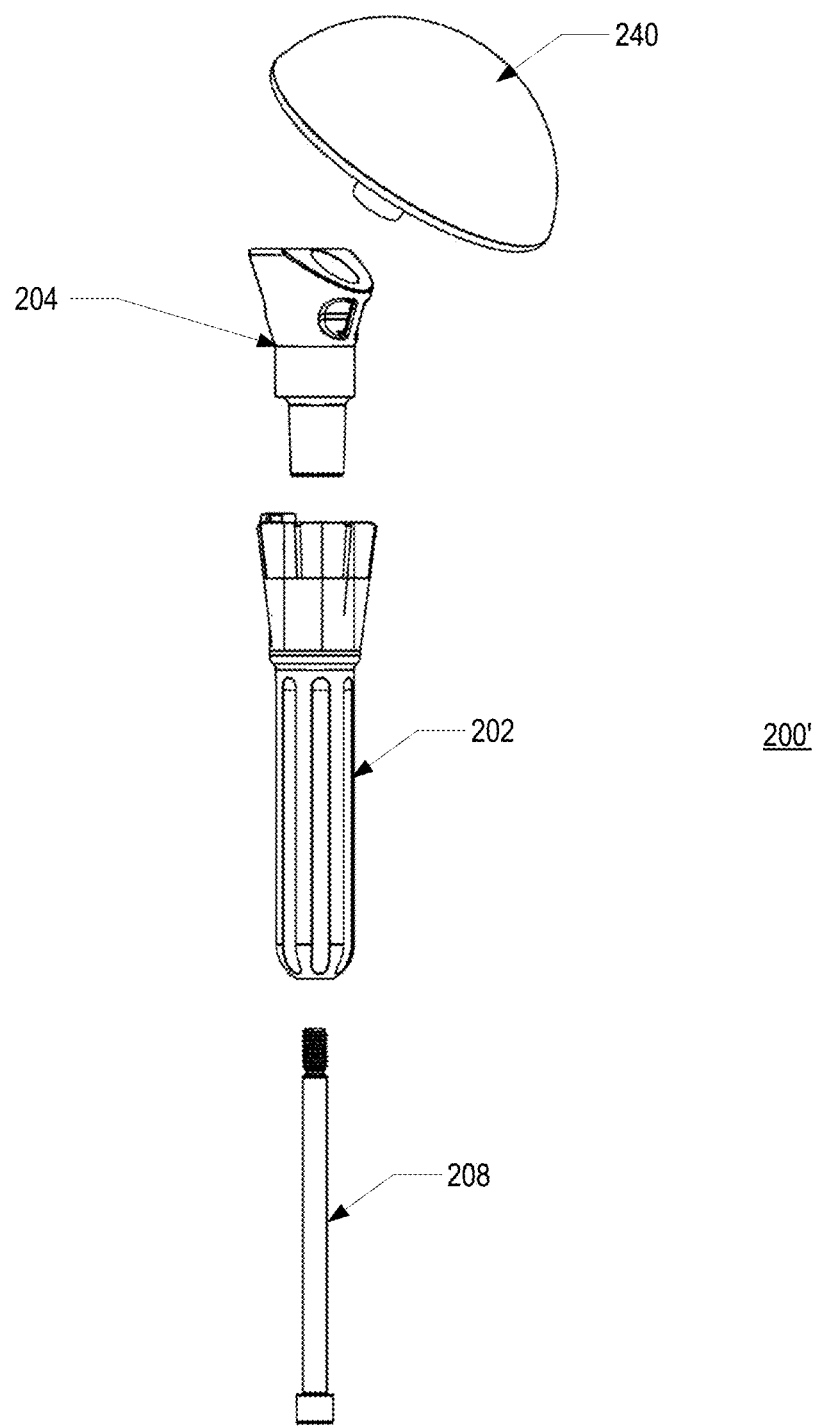
FIG. 16 shows an optional variation of a humeral component according to the present invention which is equipped with a large convex bearing element.

Variations of the disclosed prosthetic joint are also possible as needed for special situations that may arise from time to time. One such situation occurs when after performing a total reverse shoulder arthroplasty using the disclosed prosthesis it is determined that the patient is no longer a suitable candidate to continue using the reverse shoulder prothesis. This situation could arise due to, for example, failure of the scapula to support the scapular element (100), as a result of re-injury, or due to degenerative changes in the patient. In such a situation, the scapular element can be removed, and the humeral element can be modified to provide a glenosphere, instead of a cup, to interface with the natural glenoid. This avoids having to completely replace the humeral component, a procedure that could be difficult and/or traumatic to the patient. FIG. 16 shows an optional variation of a humeral component (200') to address such a situation. As shown in this figure, the cup element (206) of the humeral component has been removed, and in its place a large glenosphere (240) is attached to the coupler (204).

Figure 17:
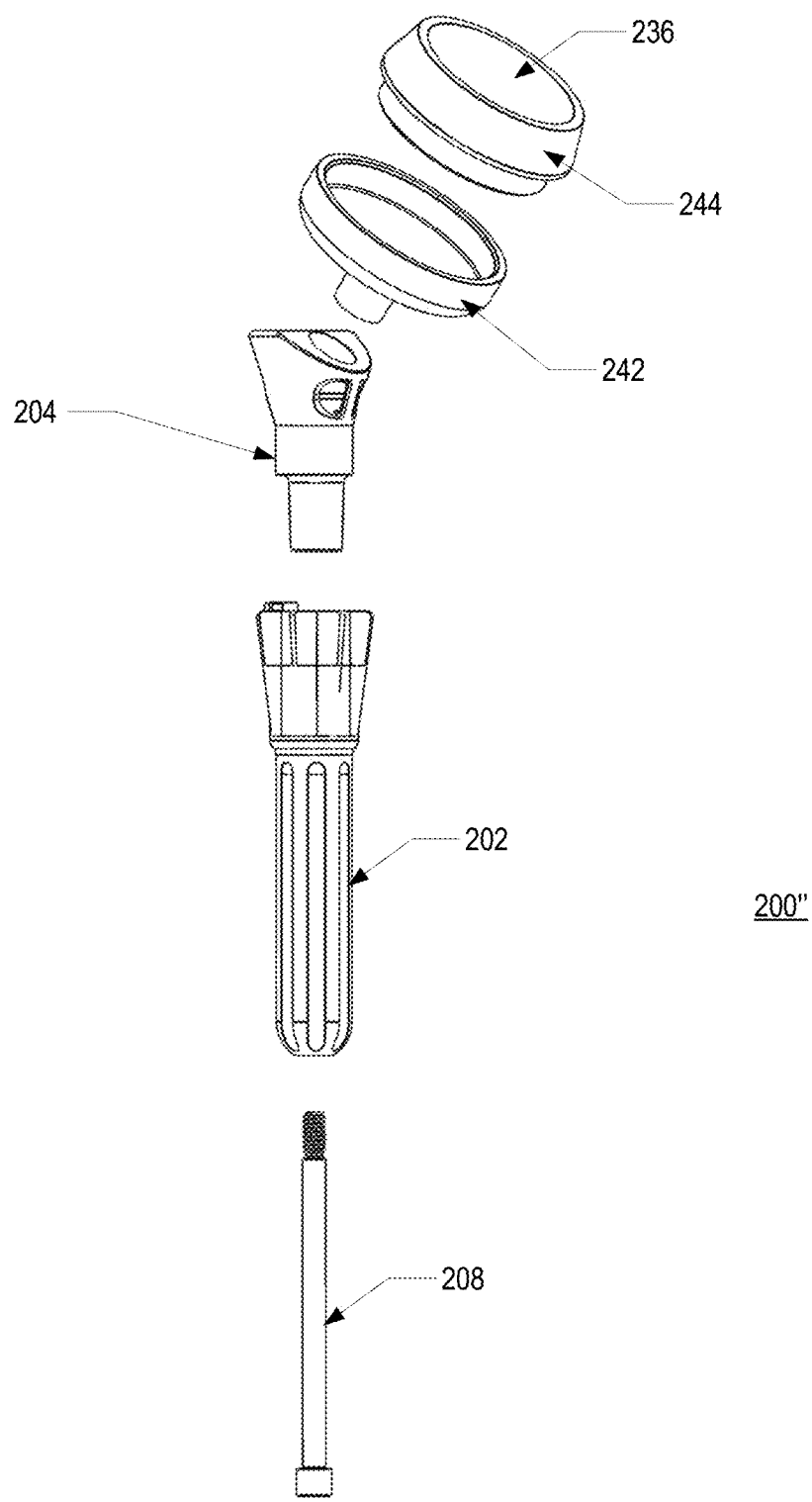
FIG. 17 shows an optional variation of a humeral component according to the present invention which is equipped with a two-piece concave bearing element.

FIG. 17 shows an alternative embodiment of the humeral component (200") in which the concave bearing surface is manufactured from plastic material, while the remaining parts are metallic. This is achieved by replacing cup (206) with a two-piece component consisting of a metallic tray (242) and a cooperating plastic cup insert (244) which comprises a concave surface.

While a number of embodiments of the present invention have been described, it is understood that these embodiments are illustrative only, and not restrictive, and that many modifications may become apparent to those of ordinary skill in the art. For example, any element described herein may be provided in any desired size (e.g., any element described herein may be provided in any desired custom size or any element described herein may be provided in any desired size selected from a "family" of sizes, such as small, medium, large). Further, one or more of the components may be made from any of the following materials: (a) any biocompatible material (which biocompatible material may be treated to permit surface bone ingrowth or prohibit surface bone ingrowth—depending upon the desire of the surgeon); (b) a plastic; (c) a fiber; (d) a polymer; (e) a metal (a pure metal and/or an alloy); (f) any combination thereof. Further still, any number of protrusions (e.g., such as for initial fixation by forming a bond with cement and/or such as for supplemental fixation by forming a bond with cement) may be utilized with a given prosthesis. Further still, any number of female features that increase the bonding area may be utilized with a given prosthesis. Further still, any number of male features that could dig into the bone so that initial/supplemental fixation can be improved may be utilized with a given prosthesis. Further still, any number of bone screws (e.g., such as for initial fixation and/or such as for supplemental fixation) may be utilized with a given prosthesis. Further still, any steps described herein may be carried out in any desired order (and any additional steps may be added as desired and/or any steps may be deleted as desired).

In addition, various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A prosthetic joint assembly for joining a humerus bone to a scapula bone, the humerus and scapula bones having a natural center of rotation relative to each other, the humerus bone having a humeral head the humerus bone being positionable with respect to the scapula bone between a rest position and an abducted position, the prosthetic joint assembly comprising:
   a humeral component having two opposite humeral ends, a first humeral end of the two opposite humeral ends comprising a humeral stem adapted for rigid engagement with said humerus bone and a second humeral end of the two opposite humeral ends comprising a concave surface;
   a scapular baseplate having a vertical dimension and two opposite baseplate sides, a first baseplate side of the two opposite baseplate sides adapted for rigid engagement with said scapula bone, and a second baseplate side of the two opposite baseplate sides comprising a trunnion, wherein the trunnion is offset inferiorly relative to a center of said vertical dimension, and wherein the trunnion comprises a first screw hole;
   a glenosphere component having two opposite glenosphere sides, a first glenosphere side of the two opposite glenosphere sides comprising an aperture adapted for rigid engagement with the trunnion, and a second glenosphere side of the two opposite glenosphere sides comprising:
      a convex surface adapted to engage said concave surface; and
      a second screw hole coaxial with the first screw hole and open to said aperture; and
   a screw component comprising:
      a first screw configured to interface with the first screw hole;
      a second screw configured to interface with the second screw hole; and
      a locking cap configured to rigidly engage said first screw with said second screw,
   wherein said screw component is configured to extend from the second screw hole, through the first screw hole, and beyond the first baseplate side to rigidly engage said glenosphere component with said scapula bone, and
   wherein when said concave surface and said convex surface are engaged said humeral component freely swivels with respect to said glenosphere component about a prosthetic center of rotation.

2. The prosthetic joint assembly of claim 1, wherein said humeral component comprises:
   a. a stem component having a longitudinal axis and two opposite stem ends, a first stem end of the two opposite stem ends comprising the humeral stem, and a second stem end of the two opposite stem ends comprising a first coupler interface;
b. a coupler component having two opposite coupler ends, a first coupler end of the two opposite coupler ends comprising a stem interface adapted to rigidly engage said first coupler interface, and a second coupler end of the two opposite coupler ends comprising a cup interface; and
c. a cup component having two opposite cup sides, a first cup side of the two opposite cup sides comprising a second coupler interface adapted to rigidly engage said cup interface, and a second cup side of the two opposite cup sides comprising said concave surface.

3. The prosthetic joint assembly of claim 1, wherein when said humeral stem is engaged with said humerus bone, said scapular baseplate is engaged with said scapula bone, and said concave surface and said convex surface are engaged in the rest position:
  a. said prosthetic center of rotation is displaced by a first distance in a first direction that is inferior and medial relative to said natural center of rotation;
  b. a ratio of said inferior displacement of said prosthetic center of rotation to said medial displacement of said prosthetic center of rotation is in a range between 0.6 and 1.2;
  c. the first distance is between 60% and 80% of a radius of said humeral head;
  d. said humerus bone is displaced by a second distance in a second direction that is inferior relative to said natural center of rotation;
  e. the second distance is between 80% and 120% of the radius of said humeral head; and
  f. the second direction is between 75 and 105 degrees below horizontal.

4. The prosthetic joint assembly of claim 3, wherein the ratio of said inferior displacement of said prosthetic center of rotation to said medial displacement of said prosthetic center of rotation is between 0.85 and 1.15.

5. The prosthetic joint assembly of claim 4, wherein the ratio of said inferior displacement of said prosthetic center of rotation to said medial displacement of said prosthetic center of rotation is approximately 1.

6. The prosthetic joint assembly of claim 3, wherein the second distance is approximately equal to the radius of said humeral head.

7. The prosthetic joint assembly of claim 1, wherein:
said scapular baseplate comprises a lower edge;
said first baseplate side comprises a scapular stem that is adapted for direct engagement with said scapula bone;
the trunnion is located proximate or adjacent to said lower edge; and
said prosthetic joint assembly further comprises an interior thread on the trunnion, the interior thread capable of receiving the locking cap.

8. The prosthetic joint assembly of claim 1, wherein:
said concave surface of said humeral component is a metallic material;
said glenosphere component further comprises a hollow plastic glenosphere cover and a solid metallic glenosphere core;
the glenosphere cover having exterior and interior surfaces, the exterior surface comprising said convex surface of the glenosphere component adapted to engage said concave surface of said humeral component, and the interior surface having a plurality of apertures;
the glenosphere core having two glenosphere sides, a first glenosphere core side of the two glenosphere sides comprising the aperture of the glenosphere component adapted for rigid engagement with the trunnion, and a second glenosphere core side of the two glenosphere sides comprising a plurality of lobes closely corresponding with the plurality of apertures on the interior surface of the glenosphere cover, the glenosphere core adapted to rigidly assemble with the glenosphere cover so as to prevent rotational motion between the glenosphere cover and the glenosphere core; and
when the glenosphere cover and the glenosphere core are assembled, and said concave surface of said humeral component engages said convex surface on the glenosphere cover, said humeral component freely swivels with respect to the glenosphere cover and the glenosphere core about said prosthetic center of rotation.

9. A method for prosthetically joining a humerus bone to a scapula bone, the humerus and scapula bones having a natural center of rotation relative to each other, the humerus bone having a humeral head, the humerus bone being positionable with respect to the scapula bone between a rest position and an abducted position, the method comprising:
  a. rigidly engaging a scapular component to said scapula bone, wherein said scapular component comprises:
    a scapular baseplate comprising:
      a first baseplate side adapted for rigid engagement with said scapula bone; and
      a second baseplate side comprising a trunnion, wherein the trunnion comprises a first screw hole;
    a glenosphere component comprising:
      an aperture adapted for rigid engagement with the trunnion; and
      a second screw hole coaxial with the first screw hole and open to said aperture; and
    a screw component comprising:
      a first screw configured to interface with the first screw hole;
      a second screw configured to interface with the second screw hole; and
      a locking cap configured to rigidly engage said first screw with said second screw,
    wherein said screw component is configured to extend from the second screw hole, through the first screw hole, and beyond the first baseplate side to rigidly engage said glenosphere component with said scapula bone; and
  b. rigidly engaging a humeral component to said humerus bone, said humeral component adapted to engage, and freely swivel with respect to, said scapular component about a prosthetic center of rotation;
  c. wherein upon engagement of said humeral component and said scapular component in said rest position, said humerus bone and said prosthetic center of rotation are displaced in a first direction that is inferior and medial relative to said natural center of rotation;
  d. wherein upon engagement of said humeral component to said scapular component in said rest position, said humerus bone is displaced in a second direction that is inferior relative to said natural center of rotation; and
  e. wherein the second direction is between 75 and 105 degrees below horizontal.

10. The method of claim 9, wherein a ratio of said inferior displacement of said prosthetic center of rotation to said medial displacement of said prosthetic center of rotation is between 0.6 and 1.2.

11. The method of claim 10, wherein the ratio of said inferior displacement of said prosthetic center of rotation to said medial displacement of said prosthetic center of rotation is between 0.85 and 1.15.

12. The method of claim 11, wherein the ratio of said inferior displacement of said prosthetic center of rotation to said medial displacement of said prosthetic center of rotation is approximately 1.

13. The method of claim 9, wherein a distance of displacement of said prosthetic center of rotation relative to said natural center of rotation is between 80% and 120% of a radius of said humeral head.

14. The method of claim 9, wherein a distance of displacement of said humerus bone relative to said natural center of rotation is between 80% and 120% of a radius of said humeral head.

* * * * *